No. 887,396.   PATENTED MAY 12, 1908.
R. D. HUNT.
SHOE FOR MOTION TRANSMISSION CHAINS.
APPLICATION FILED JULY 29, 1907.
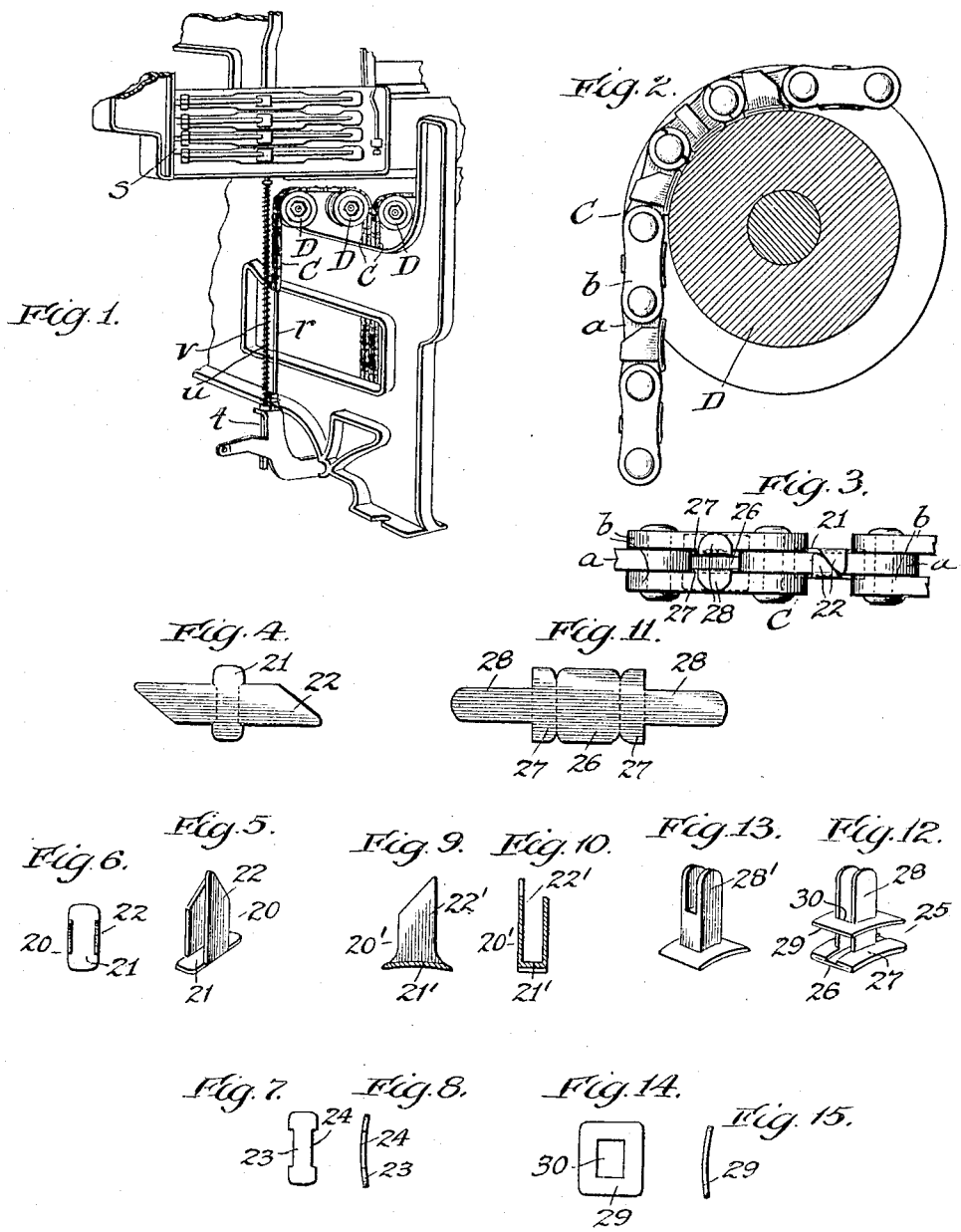
Witnesses
Ray White
M. H. Olsen
Inventor
Randall D. Hunt,
By Forée Bain & May
Attys

UNITED STATES PATENT OFFICE.

RANDALL D. HUNT, OF LAPORTE, INDIANA.

SHOE FOR MOTION-TRANSMISSION CHAINS.

No. 887,396.　　　　Specification of Letters Patent.　　　Patented May 12, 1908.

Application filed July 29, 1907. Serial No. 385,966.

*To all whom it may concern:*

Be it known that I, RANDALL D. HUNT, a citizen of the United States, residing at Laporte, in the county of Laporte and State of Indiana, have invented certain new and useful Improvements in Shoes for Motion-Transmission Chains, of which the following is a specification.

My invention relates to improvements in means for compensating for or preventing wear in motion transmission chains, and has for its salient object to provide means of the character described which are simple in construction, cheap and easy of manufacture, and easily applied for use and detached.

One use to which my invention is particularly adapted is in connection with looms, wherein motion transmission chains are employed in moving the shuttle boxes to varying positions to bring the different shuttles into register with the race. It is well known that such movements of the shuttle boxes of a power loom must be accurate to a fine degree to prevent damage of the machine, but the maintenance of accurate movement is a matter of great difficulty owing to the uneven wear imposed upon different parts of the motion transmission connections. It will be understood that the maximum range of movement of the motion transmission chains is but small, and that the shuttle boxes must be moved many times to and from the position which brings the shuttle carrying thread of the predominating color of the pattern into register with the shuttle race. Consequently greater wear is imposed on the chain links which engage the pulleys to secure such positioning of the boxes than upon other, less-used, links, and such wear upon certain links and corresponding spots in the pulleys gradually produces local variations in the adjustment of the chain resulting in the failure of register of certain shuttles with the race while not affecting other shuttles. Such local wear must obviously be locally compensated for, and for such work my invention is particularly adapted. I have, therefore, herein shown my invention as applied to a loom chain, but it will be apparent that its use is not necessarily so limited, and that the illustration and descriptive matter herein referring to looms is suggestive only and not limitational.

In the drawings: Figure 1 is a perspective detail of a fragment of a loom, showing in position for use a chain equipped with wear compensating or preventing means embodying my invention. Fig. 2 is a section with parts in elevation, showing the use of a chain equipped with my invention, with a pulley wheel. Fig. 3 is a plan view of a fragment of chain equipped with my invention, and, Fig. 4 is a detail of a blank, and, Figs. 5 and 6 are respectively perspective and plan views of the solid-link shoe made therefrom. Figs. 7 and 8 are plan and side views of a washer for employment with said solid-link shoe. Figs. 9 and 10 are longitudinal, transverse sections of a cast metal solid-link shoe. Fig. 11 shows a blank for a sheet metal open-link shoe. Fig. 12 shows the same formed up. Fig. 13 indicates a cast metal open-link shoe, and, Figs. 14 and 15 are plan and side elevations of a washer for association with the open-link shoe of either construction.

Throughout the drawing like numerals of reference refer always to like parts.

It will be observed that each of the shoes illustrated provides a tread, sole, or wearing surface and attaching fingers extending upward therefrom, in separated relation, such fingers being suitable to be bent to embrace portions of the chain link, and retain the wearing tread in proper position upon a wearing surface of the chain when the latter is employed upon a smooth pulley. In each construction the tread of the shoe is preferably of such size as to efficiently cover the wearing surface of the chain link and the attaching fingers are so disposed as to make a tight lateral fit with the surfaces of the chain link to prevent the shoe from moving sidewise, and of such length that the extremities of the fingers may be bent to embrace the edges of the link opposite the tread of the shoe to retain the tread in position.

A motion translation chain, as indicated in Figs. 2 and 3 usually comprises solid links *a* and open links *b* the two members of the open link being connected pivotally to the opposite sides of a solid link. In looms such chains are employed, as indicated in Fig. 1, for the purpose of transmitting motion to the shuttle boxes *s*, such a box-lifting chain generally lettered C, passing over smooth rollers D and being connected through the box chain rod *r* with the box-tube collar *t* which has connection through the box lifting rod *u* and its surrounding spring *v* with the shuttle box structure. As indicated in Fig. 1 the pulleys D are often located in close proximity to each other so that but little space is left between oppositely passing sections of the box-lifting chain. Therefore, it is important that the shoes attached to the chain shall have no rearward projections beyond the limits of travel of the normal outline of the chain.

In the embodiment of my invention I provide shoes of appropriate sizes and shapes respectively for connection with the solid links and with the open links of the chain, and for association with each such shoe I provide appropriately shaped washers.

In the specific construction shown in Figs. 4, 5 and 6 the shoe, generally indicated at 20, is made of sheet metal blanked out in the form shown in Fig. 4, to provide a tread portion 21 of appropriate shape to fit over and cover the wearing surface of a solid link, provided with fingers 22 oppositely tapering at their ends, such blanks being bent to the configuration shown in Figs. 5 and 6 so that the fingers 22 stand at approximate right angles to the general plane of the tread 21, the tread 21 being preferably longitudinally curved to conformity with the wearing surface of the solid link.

In attaching a shoe, as described, such structure is slipped into place with its fingers 22 straddling the sides of the link, and the extremities of the fingers are then bent inward, as shown in Fig. 3, the oppositely tapering ends of such fingers extending past each other without overlapping. Where it is desired that the shoe shall have a thickness greater than that of the metal composing the tread or sole thereof washers 23 shaped to correspond with the tread of the shoe and provided with side recesses 24 to receive the fingers 22, are inserted between the fingers, to be positioned between the tread and the link. Obviously these washers in any suitable number may be slipped between the fingers 22 so that when the structure is applied to the chain the wearing surface is at any desired distance from the line of pivot center.

As shown in Figs. 9 and 10, such a structure as that heretofore described may be made of cast-metal, in which event the shoe-tread 21' is usually thicker than when made of sheet metal, and may be tapered in any suitable manner to its ends, while the fingers 22' may be made of any desired contour.

The shoes for the open links may, as shown in Figs. 11 and 12 be made of sheet metal, in which case a shoe, generally indicated at 25 is blanked out in the form of a tread portion 26, as wide as the full width of the open chain link, backing sections 27 each less than half the width of the part 26, and fingers 28 projecting centrally of the parts 27. When the blank is folded on the dotted lines, as indicated in Fig. 11, to the configuration shown in Fig. 12, the parts 26 afford the tread, the parts 27 overlie and back up said tread and the fingers 28 project vertically therefrom in separated relation. Preferably the parts 26 and 27 are given a longitudinal curvature to coincide with the curvature of the open chain link.

Washers 29 may also be provided corresponding in shape with the tread surface of the completed shoe and provided with central apertures 30 to receive the fingers 28. In use the fingers 28 are slipped in between the side pieces of the hollow chain links until the surfaces 27 or the washers 29 in rear thereof rest against the wearing surface of the chain, and the ends of the fingers 28 are bent outwardly, as shown in Fig. 3 to detachably secure the shoe in position. As indicated in Fig. 13 such a shoe may be made by casting, in which event it is unnecessary that the fingers 28' thereof should be separated all the way from the tread to their extremities, and it is more convenient to form the lower portions of the fingers in one piece as a solid stem.

In use on a loom the shoes may be applied to the chain while the latter is new to take up wear, and it will be apparent that such shoes enable the uneven wear, heretofore adverted to, to be compensated for, for as fast as a shoe is worn it may be removed and a new one inserted in place thereof. Furthermore my invention is valuable for the preservation of worn chains, as by their use the wear already imposed upon the chain may be compensated for by building up the links at the worn spots so that the effective adjustment of the chain is maintained always the same. By this means variation in the movement of the shuttle box due to the unequal wear of different chain links may be prevented, and consequent damage to the loom incident to improper movements of the shuttle boxes prevented.

While I have herein described in some detail specific embodiments of my invention, which I believe to be new and I have found to be useful in practice I do not desire to be understood as limiting my invention to the particular construction shown and described further than as specified in the claims.

Having thus described my invention, what I claim and desire to secure by Letters Patent of the United States, is:

1. In combination with a link chain, detachable wearing shoes, each providing a tread for covering the wearing surface of the link, and projections from said tread, arranged and adapted to be bent over the opposite edge of the link to retain the tread in place.

2. In combination with a link chain, detachable shoes, each providing a tread and fingers projecting from said tread, arranged to be upset to embrace parts of the link and secure the tread to the link.

3. In combination with a chain, detachable wearing shoes therefor, each providing a tread for covering the wearing surface of the link, and two integral fingers projecting from said tread, arranged each in parallelism to a side surface of the link to be bent down over the edge of the link opposite the wearing surface thereof.

4. As an article of manufacture, a link chain shoe comprising a tread and fingers projecting from said tread at right angles thereto of sufficient length to be bent down to embrace a link member of a chain.

In testimony whereof I hereunto set my hand in the presence of two witnesses.

RANDALL D. HUNT.

In the presence of—
 BESSIE FOLANT,
 JULIUS C. TRAVIS.